Jan. 12, 1943. J. R. CUBERT 2,308,270
"A" AND "B" BATTERY UNIT
Filed April 19, 1940

INVENTOR.
Joseph R. Cubert
BY Arthur A. Durand
ATTORNEY.

Patented Jan. 12, 1943

2,308,270

UNITED STATES PATENT OFFICE 2,308,270

"A" AND "B" BATTERY UNIT

Joseph R. Cubert, Chicago, Ill., assignor to Aurex Corporation, Chicago, Ill., a corporation of Illinois Application April 19, 1940, Serial No. 330,480

4 Claims. (Cl. 136—171)

This invention relates to batteries, and more particularly to those that are used in connection with portable hearing aids, the combination "A" and "B" battery unit being of a size and shape to be carried in the pocket of a coat.

Generally stated, the object of the invention is to provide a novel construction and arrangement whereby the "B" battery, or high potential battery, is embodied in a substantially or practically flat and oblong body, and whereby the "A" battery, or low potential battery, is embodied in a cap for one end of said body, or in something else, so that, by easily removing the said cap or other support, the single cell forming the "A" battery can be pulled out and replaced by a new one.

It is also an object to provide certain details and novel features of construction tending to increase the general efficiency and desirability of a combination "A" and "B" battery of this particular character.

To the foregoing and other useful ends, the invention consists in matters hereinafter set forth and claimed and shown in the accompanying drawing, in which—

Figure 1:
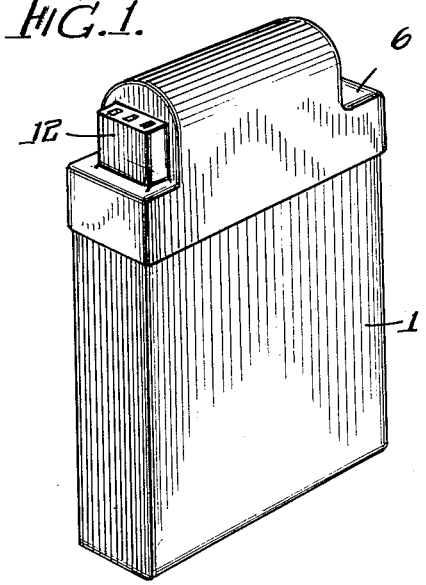
Fig. 1 is a perspective of a combination "A" and "B" battery unit embodying the principles of the invention.

As thus illustrated, the invention comprises a substantially or practically flat and oblong body 1, having relatively wide flat side walls and relatively narrow edge walls 2, a flat bottom wall 3, and a flat top wall 4. The interior of the casing thus provided is divided into horizontal rectangular compartments, and the cylindrical battery cells 5 are disposed in said compartments, with the axes of the cells horizontal and transverse of the relatively wide side walls of the battery casing. This is shown clearly in Figure 2 of the drawing, and it will be understood that the said rectangular casing thus provided may be of any suitable or desired material. A plurality of battery cells in said flat and oblong body are connected together in any suitable or desired manner, to provide a high potential or so-called "B" battery for a hearing aid apparatus.

Figure 2:
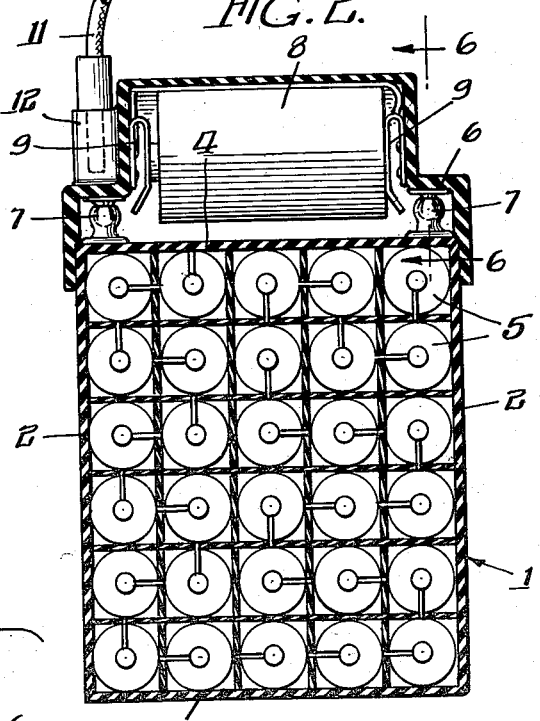
Fig. 2 is a vertical section of said battery unit, in the plane immediately inside one flat side wall of the unit.
Figure 3:
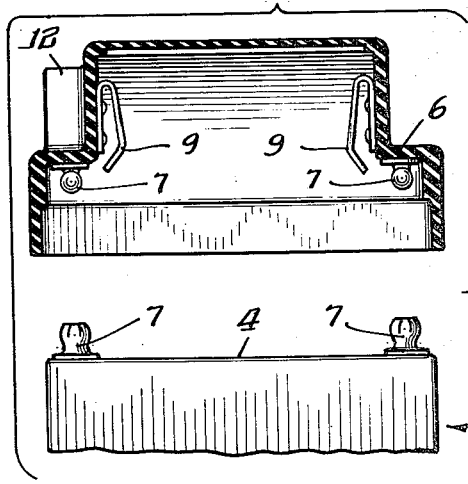
Fig. 3 is a fragmentary view showing the cap and body separated, with the lower portion of the body shown broken away for convenience of illustration.
Figure 6:
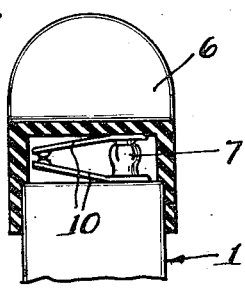
Fig. 6 is a fragmentary vertical section on line 6—6 in Fig. 2 of the drawing.

The cap 6 may be of any suitable or desired material and is formed to fit down around the top of the rectangular battery body, as shown more clearly in Figs. 2 and 6 of the drawing. As shown, so-called glove snaps 7 are provided as separable connection between the cap and the said body, but these snap connections may be of any suitable or desired character, the important thing being to provide an easy but safe separable connection between the cap and the body. A relatively large cylindrical battery cell 8 is disposed horizontally in said cap, lengthwise of the latter, and may be held in place by spring contacts 9 that are connected in the circuit of the combination battery. Thus, the "A" battery cell 8 is easily removable, when the cap is removed from the top of the body. The snap connections 7 may be included in the electric circuit of the battery unit, in any apparatus with which it may be used, but sometimes these snap connections are somewhat loose, and as a precaution, metal spring contacts 10 are provided on the cap and body, for engagement with each other, and included in the circuit of the battery unit, so that if a snap connection is loose, it will not open the circuit.

A cord connection 11 may have separable connection with an outlet 12 on the cap, so that proper battery current will be obtained from the said combination unit by the user of the hearing aid apparatus.

Figure 4:
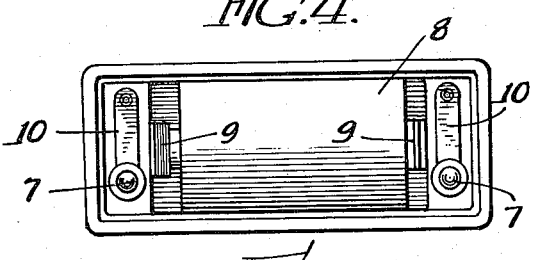
Fig. 4 is a bottom view of said cap.
Figure 5:
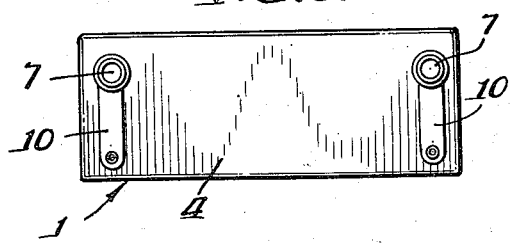
Fig. 5 is a top view of said body.

Looking at Figs. 4, 5 and 6, it will be seen that the snap connectors 7 are laterally offset to prevent the cap or cover 6 from being snapped on incorrectly when it is applied to the "B" battery body. In other words, the cap cannot be turned end for end, and then snapped on as the snap connectors will not work when the cap is thus reversed on the body.

Thus, a combination "A" and "B" battery is provided, which is comparatively inexpensive to manufacture, and which is yet attractive in appearance and of a shape and size to be comfortably carried in the pocket of a coat. As there is practically no waste space in the rectangular "B" battery body, the latter may be of minimum height or length, the "A" battery being entirely outside of the cellular area of the combination unit, whereby the "A" battery does not occupy any space that could be occupied by some of the smaller cells of the "B" battery. At the same time, the removable "A" battery cell is entirely enclosed and is protected against accidental displacement from the cap of the combination unit, so that one "A" battery after another can be used during the life of the "B" battery. When the "B" battery is exhausted, it can be thrown away and replaced by a new one, as the cap 6 can be made for use with successive "A" batteries of the kind shown and described. In other words, the said cap is the only thing that needs to be made substantial for permanent or long use, as everything else can be made cheaply to be thrown away when exhausted.

The invention broadly considered provides a novel construction in which the "B" battery cells form a flat body and in which the "A" battery cell is entirely outside of the area of the said body and is readily detached and removable from the unit as a whole.

It is obvious, of course, that the parts 1 and 6 are made of insulating material, of one kind or another, and that the partitions shown between the cells 5 should also be made of insulating material, but all circuit connections are, of course, made of metal.

It is important to observe that the "A" battery cell 8 can not be removed from the holder 6 until after the latter is removed from the flat body forming the "B" battery. In other words, the holder 6 must be completely detached from the said body before the "A" battery can be removed and replaced by a new one. It is also important to observe that the axes of the "B" battery cells 5 are horizontal and at right angles to the sides of the unit, and that the axis of the "A" battery 8 is also horizontal but at right angles to said other axes. In this way, waste space is minimized, greater compactness is obtained, and the unit is smaller.

What I claim as my invention is:

1. An "A" and "B" battery unit for a portable hearing aid or the like including a permanently integrated generally flat rectangular container in which "B" battery cells are embodied, an enclosing housing for one end of said container having an open side defined by marginal wall portions adapted to receive an end of the container and embrace the periphery thereof, conducting fastener means on the end of the container, cooperating conducting fastener means on the housing interiorly of said opening operative to interlock in a direction normal to the end of the container when said periphery of the end is embraced by the marginal walls of the housing and being resiliently separable, means within the housing for releasably receiving an "A" battery cell, terminal connector means mounted on the housing, means connecting the terminals of said "B" battery to the first named fastener means, and connections from said cooperating fastener means and said "A" battery receiving means to the said terminal connector means.

2. An "A" and "B" battery unit for a portable hearing aid or the like including a permanently integrated generally flat container in which "B" battery cells are embodied, an enclosing housing for one end of said container having closed outer walls defining an enclosure for an "A" battery cell and having an open side defined by plane peripheral wall portions integral with said walls and forming a generally flat enclosure adapted to receive an end of the container and embrace the periphery thereof, first fastener means at the end of the container, cooperating fastener means on the housing interiorly of said housing and lockingly engageable through the open side of the housing with the first fastener means in a direction normal to the end of the container when said periphery of the end is received in said generally flat enclosure and embraced by the plane peripheral wall portions of the housing to secure the housing to the container, said first and cooperating fastener means being releasably interlocked, and means in the housing for resiliently mounting an "A" battery cell within its said enclosure.

3. An "A" and "B" battery unit for portable hearing aid or the like including a permanently integrated, generally flat container in which "B" battery cells are embodied, an enclosing housing for one end of said container having closed outer walls defining in the upper portion of the housing an open-bottom upper enclosure for a "A" battery cell and having peripheral wall portions integrally united with said walls by lateral wall portions and defining in the lower portion of the housing a larger, lower enclosure with an open bottom adapted to receive said one end of the container with the peripheral wall portions forming the lower enclosure of the housing snugly embracing the periphery of the container, first fastener means at the top of the container, cooperating fastener means mounted in the lower enclosure of the housing outside of the open bottom area of the upper enclosure of the housing to permit insertion and removal of the "A" battery through the open bottom of the lower, larger enclosure of the housing and lockingly engageable through the open bottom of the lower enclosure of the housing with the first fastener means in a direction normal to the top of the container when said periphery of said one end of the container is received in said lower enclosure to secure the housing to the container, said first and cooperating fastener means being releasably interlocked, and means in the upper enclosure of the housing for releasably mounting an "A" battery cell within said upper enclosure of the housing.

4. An "A" and "B" battery unit for a portable hearing aid or the like including a permanently integrated generally flat rectangular container in which "B" battery cells are embodied, an enclosing housing for one end of said container having an open side defined by marginal wall portions adapted to receive an end of the container and embrace the periphery thereof, said housing being provided with shoulders interiorly thereof but adjacent opposite ends forming an enlarged recess intermediate of said shoulders for releasably receiving an "A" battery cell, said shoulders presenting surfaces generally parallel to the plane of said open side and mounting conducting snap fastener means thereon, cooperating conducting snap fastener means on the end of the container operative to resiliently interlock in a direction normal to said end of the container when the periphery of the side is embraced by the marginal walls of the housing and being resiliently separable, terminal connector means on the housing adjacent one of said shoulders and yieldable connections between said terminal connector means and said battery terminals.

JOSEPH R. CUBERT.